United States Patent Office 2,916,047
Patented Dec. 8, 1959

2,916,047

AUTOMATIC REGULATION OF THE RATE OF FLOW OF A FLUID THROUGH A PIPE OR THE LIKE

Kenneth L. Butcher, Baildon, Shipley, England

Application December 18, 1953, Serial No. 399,110

Claims priority, application Great Britain December 22, 1952

1 Claim. (Cl. 137—501)

This invention relates to the automatic regulation of the rate of flow of a fluid through a pipe, tube, duct or the like and has for its chief object to provide apparatus for this purpose which is self-acting and self-contained and capable of being pre-set to give a substantially constant predetermined rate of delivery in spite of variations in the supply and/or delivery pressures, provided the difference between these pressures is above a certain minimum necessary to actuate the apparatus.

While self-acting mechanisms for the regulation of the rate of flow of a fluid to a substantially constant and pre-determined value have been known for some time, the range of application, speed of response and accuracy of control of such devices need improvement to satisfy many present day industrial requirements. The present invention aims at achieving a greater accuracy, wider range of usefulness and higher speed of control than has so far been accomplished in mechanisms working on a similar principle using a pressure-responsive device and employing the well known relationship between (1) the pressure difference across an orifice caused by a flow of fluid through the orifice, and (2) the magnitude of the flow.

According to the invention the improved apparatus includes a valve chamber through which the main fluid flows and which has a valve actuated by movement of a pressure-responsive device, said valve being of the double-beat mushroom type accurately balanced by being exposed on both sides to the pressure of the fluid passing through the valve chamber, the valve being adjustable relative to its actuating pressure-responsive device and having one of its two seating surfaces independently adjustable relative to the valve faces, the apparatus being arranged so that the main fluid can flow into said valve chamber through a pipe or the like incorporating a flow-restriction orifice and so that the pressure-responsive device is moved by the differential pressures of the main fluid on the up-stream and down-stream sides of said orifice, the arrangement of the apparatus being such as to maintain automatically a substantially constant rate of delivery of the main fluid from the apparatus in spite of variations in the supply and/or delivery pressures. This substantially constant delivery rate is maintained, and/or the delivery pressure, always provided the pressure differential is sufficient to establish a controllable flow.

The pressure-responsive device may take the form of an elastic membrane such as a bellows with its movable part operatively associated with the valve, such membrane being located so as to be moved by the said pressure differential.

In order that the invention may be more clearly understood and readily carried into effect the same will now be more fully described with reference to and by the aid of the accompanying drawings which illustrate two constructional forms of apparatus according to the invention.

Figure 1:
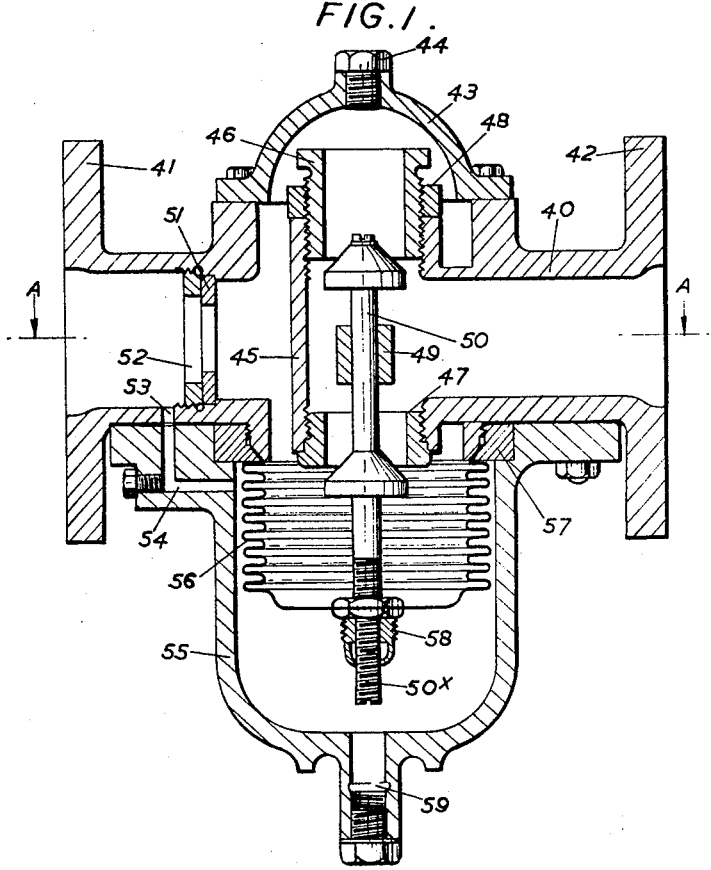
Fig. 1 is a vertical section of the device of the present invention.
Figure 2:
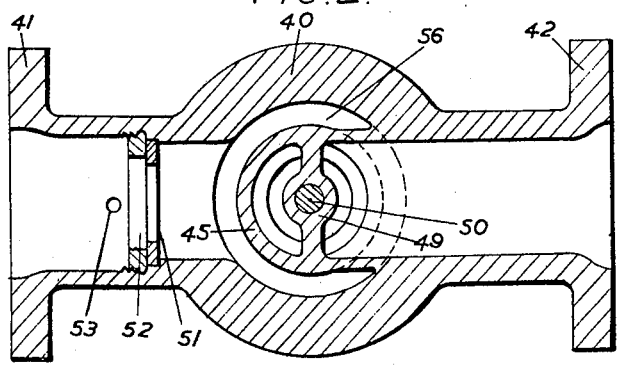
Figure 2 is a horizontal section taken on the line A—A of Figure 1.

Referring to the construction of Figures 1 and 2 the apparatus consists of a valve chamber housing 40 with flanged inlet 41 and flanged outlet 42 for connection to the supply and delivery pipes respectively, and a top cover plate 43 with plug 44 which can act as a vent. The housing has a central boss 45 into which are screwed upper and lower valve seatings 46, 47, the former being adjustable and having a lock nut 48. A short inner boss 49 guides the double-beat mushroom type valve 50 which is balanced to give a floating valve effect.

An orifice plate 51 is located in the inlet side of the housing 40 by a screwed ring 52 and a port 53 upstream of this communicates by passage 54 with the interior of a bellows housing 55 secured to the housing 40. The bellows 56 has the properties of a spring and has its upper open end secured by a screwed collar 57 to the housing 40. Its closed lower end is secured to the threaded extension $50^x$ of the valve stem by a locking device 58 and can be adjusted up or down relative to the valves by rotating the valve stem with a screw driver inserted through a bottom plug opening 59.

With such a construction it will be seen that the bellows interior is exposed to the fluid pressure downstream of the restriction orifice 51 and its exterior to the upstream pressure. The magnitude of this difference in pressure depends upon the magnitude of the flow of fluid through the restriction, and when this reaches a value determined by (a) the size of the restriction (b) the stiffness of the bellows, and (c) the original distance of the valve heads from their respective seats, equilibrium is established, maintaining this flow, by balancing the force on the bellows exerted by the differential pressure against the spring force caused by the deflection of the bellows.

Different values of the desired flow may conveniently be predetermined by:

(1) Screwing the valve stem more or less into its support on the bellows.
(2) Altering the size of the restriction orifice 51.
(3) Altering the distance of both valve seats from the bellows' support.

The position of the valve relative to the seat may be indicated by extending the valve stem through the plug opening in the top cover plate 43 into a transparent chamber containing a graduated scale, and capable of accommodating the full longitudinal travel of the valve.

The use in the above described constructions of apparatus of a well balanced double-beat mushroom type valve gives very accurate control of the rate of delivery flow within a wide range of supply and delivery pressures, but the two seats should be approximately of the same cross-sectional area. However, when the difference between the supply and delivery pressures rises, the slight diminution in flow which would take place if these areas were identical and the valves seated simultaneously can be eliminated by moving the seat remoter from the float or bellows by a small distance away from the other seat; alternatively, if the valves seat simultaneously the remoter seat would be of slightly larger area. For example, the seat further from the pressure-responsive device may be 1.031 inches diameter whilst the other is only 1.000 inch diameter.

Any tendency to undesired oscillating of the pressure-responsive device may be minimised by interposing a damping restriction orifice or the like in the passage 54 of Figure 1.

The short frictional bearing surfaces which guide the valve spindle in the above-described constructions contribute to the accuracy and speed of response of the apparatus by rendering the valve very sensitive even when controlling the flow of dirty or viscous liquids.

An apparatus according to the invention is not only automatic, but also self-acting and self-contained in that the power for operating it is provided by the fluid whose flow is controlled by it. The term "fluid" has been used because the apparatus according to the invention may be suitable for controlling the flow of gases in certain circumstances—viz. in either of the illustrated constructions, with a steady supply density but fluctuating delivery density; or, by placing the restriction orifice on the other side of the valve and reversing the action of the valve, with a fluctuating supply density but a steady delivery density.

I claim:

In apparatus for automatically regulating the rate of flow of a fluid through a pipe or the like, a valve housing, a valve chamber formed in said housing, an inlet pipe joined to said housing and communicating with said chamber for directing fluid into said chamber, a restriction element positioned in said inlet pipe adjacent said valve chamber, means for retaining said restriction element in said inlet pipe, valve means positioned in said chamber and including spaced valve members, said valve means having a depending stem joined thereto, spaced valve seats disposed in said valve chamber adjacent each of said valve members, one of said valve seats being adjustable with respect to the adjacent valve, an outlet pipe joined to said housing and communicating with said chamber for receiving fluid passing through said chamber under control of said valve means, a casing secured to said housing, a pressure responsive elastic bellows positioned in said casing, the open side of said bellows being secured to said casing adjacent the other of said valve seats, said bellows receiving fluid from the downstream side of said restriction element and directing said fluid through said last named valve seat, the interior of said bellows thereby forming part of the flow path of said fluid and being responsive to pressure of the fluid on the downstream side of said restriction element passing therethrough, said depending valve stem extending into the interior of said bellows and secured to the closed end thereof and movable in response to movement of said bellows, means for adjusting said valve means relative to said seats, said adjusting means being immediately accessible through an opening formed in said casing, a passage formed in said casing and extending into said inlet pipe and communicating with the upstream side of said restriction element, said passage providing communication between said inlet pipe and the interior of said casing, said bellows thereby being responsive to the pressure differential between the upstream and downstream sides of said restriction element to flex said bellows and cause movement of said valve means, whereby said valve means automatically maintains a constant rate of delivery of said fluid through said inlet and outlet pipes.

References Cited in the file of this patent

UNITED STATES PATENTS

| | | |
|---|---|---|
| 1,268,597 | Montreuil | June 4, 1918 |
| 1,699,676 | Rush | June 22, 1929 |
| 1,787,686 | Kerr | Jan. 6, 1931 |
| 2,001,534 | Hughes | May 14, 1935 |
| 2,217,635 | Bailey | Oct. 8, 1940 |
| 2,376,383 | Richards | May 22, 1945 |
| 2,516,333 | Moore | July 25, 1950 |
| 2,560,948 | Hannibal | July 17, 1951 |
| 2,737,979 | Parker | Mar. 13, 1956 |

FOREIGN PATENTS

| | | |
|---|---|---|
| 26,615 | Great Britain | 1912 |
| 241,064 | Switzerland | June 17, 1946 |